United States Patent
Ma et al.

(10) Patent No.: US 10,955,694 B2
(45) Date of Patent: Mar. 23, 2021

(54) BACKLIGHT MODULE AND LIQUID CRYSTAL DISPLAY APPARATUS

(71) Applicant: BOE TECHNOLOGY GROUP CO., LTD., Beijing (CN)

(72) Inventors: Yongda Ma, Beijing (CN); Xinyin Wu, Beijing (CN); Yong Qiao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 65 days.

(21) Appl. No.: 16/463,073

(22) PCT Filed: Nov. 29, 2018

(86) PCT No.: PCT/CN2018/118063
§ 371 (c)(1),
(2) Date: May 22, 2019

(87) PCT Pub. No.: WO2019/184412
PCT Pub. Date: Oct. 3, 2019

(65) Prior Publication Data
US 2020/0387023 A1 Dec. 10, 2020

(30) Foreign Application Priority Data
Mar. 28, 2018 (CN) .................... 2018 2 0429496 U

(51) Int. Cl.
*G02F 1/1333* (2006.01)
*G02F 1/13357* (2006.01)

(52) U.S. Cl.
CPC .. *G02F 1/133308* (2013.01); *G02F 1/133605* (2013.01); *G02F 1/133608* (2013.01); *G02F 1/133615* (2013.01)

(58) Field of Classification Search
None
See application file for complete search history.

(56) References Cited

U.S. PATENT DOCUMENTS

2009/0067112 A1* 3/2009 Takabayashi ..... G02F 1/136204
361/220
2011/0013387 A1 1/2011 Kanade et al.

FOREIGN PATENT DOCUMENTS

| CN | 1971376 A | 5/2007 |
|---|---|---|
| CN | 203023949 U | 6/2013 |
| CN | 204331227 U | 5/2015 |
| CN | 106681053 A | 5/2017 |
| CN | 207937735 U | 2/2018 |

OTHER PUBLICATIONS

International Search Report and Written Opinion for International Appl. No. PCT/CN2018/118063, dated Feb. 27, 2019.

* cited by examiner

*Primary Examiner* — James A Dudek
(74) *Attorney, Agent, or Firm* — The Webb Law Firm

(57) ABSTRACT

The present disclosure relates to a backlight module and a liquid crystal display apparatus. The backlight module includes: a light source assembly; a frame, to which at least a portion of the light source assembly is connected; and a bottom reflective sheet, at least a portion of a thickness of which is overlapped with a thickness of the frame in a thickness direction of the backlight module.

9 Claims, 3 Drawing Sheets

US 10,955,694 B2

BACKLIGHT MODULE AND LIQUID CRYSTAL DISPLAY APPARATUS

CROSS-REFERENCE TO RELATED APPLICATIONS

The present application is a U.S. National Stage Application under 35 U.S.C. § 371 of International Patent Application No. PCT/CN2018/118063, filed on Nov. 29, 2018, which claims priority to CN Application No. 201820429496.8, filed on Mar. 28, 2018. The disclosure of both of which are incorporated into the present application by reference in their entirety.

TECHNICAL FIELD

The present disclosure relates to a backlight module and a liquid crystal display apparatus.

BACKGROUND

In a Liquid Crystal Display (referred to as LCD) apparatus, a backlight module can provide backlight for a liquid crystal panel, such that the liquid crystal panel can display a user watchable visual picture.

A common backlight module includes both forms of a edge-type and a direct-type, wherein the edge-type backlight module includes a light guide plate, and a light beam emitted from the light source is incident from a side of the light guide plate and outputted to a top surface of the light guide plate under a reflective effect of the light guide plate. In an example of the related techniques of the edge-type backlight module, a bottom reflective sheet of the backlight module is disposed, in its entirety, below a frame.

SUMMARY

On one aspect of the present disclosure, a backlight module is provided, including: a light source assembly; a frame, to which at least a portion of the light source assembly is connected; and a bottom reflective sheet, at least a portion of a thickness of which is overlapped with a thickness of the frame in a thickness direction of the backlight module.

In some embodiments, at least a portion of the bottom reflective sheet adjacent to a light incident side is embedded into a border of the frame adjacent to the light incident side.

In some embodiments, the light source assembly is located above a portion of the bottom reflective sheet that is embedded into the frame.

In some embodiments, a concave-convex mating structure is formed between an edge of one side of the bottom reflective sheet adjacent to the frame and the frame.

In some embodiments, the concave-convex mating structure includes: one or more concave portions located on one side of the frame adjacent to the bottom reflective sheet; and one or more convex portions located at an edge of one side of the bottom reflective sheet adjacent to the frame and embedded into the concave portions.

In some embodiments, the light source assembly includes: a light source mounting rack mounted on the frame; and one or more point light sources disposed on a surface of the light source mounting rack, wherein the point light sources protrude into the concave portions and are located over the convex portions.

In some embodiments, at least two said convex portions have different lengths in a direction from the frame to the bottom reflective sheet.

In some embodiments, among a plurality of said convex portions arranged at intervals along the edge of the bottom reflective sheet, the length of the convex portions located in a middle region of the side is less than the length of the convex portions located in an end region of the side.

In some embodiments, an inward concave structure in a direction away from the bottom reflective sheet is formed on the frame, and the bottom reflective sheet is embedded into the inward concave structure and supports an upper side wall of the inward concave structure.

In some embodiments, the backlight module further includes: a bottom plate located below the frame and further connected with a side plate, the side plate being embedded into an entity portion of the frame along a thickness direction of the frame.

In some embodiments, the backlight module further includes: a bottom plate located below the frame and further connected with a positioning portion, the positioning portion being embedded into the bottom plate along a thickness direction of the frame.

On another aspect of the present disclosure, a liquid crystal display apparatus is provided, including the aforementioned backlight module.

BRIEF DESCRIPTION OF THE DRAWINGS

The drawings, which serve as a portion of the Specification, describe embodiments of the present disclosure, and are used, together with the Specification, to explain principles of the present disclosure.

With reference to the drawings, the present disclosure may be understood more clearly according to the following detailed descriptions.

It should be understood that the dimensions of the various parts shown in the drawings are not drawn in the actual scale relationship. Further, the same or similar reference numerals denote the same or similar components.

DETAILED DESCRIPTION

Figure 1:
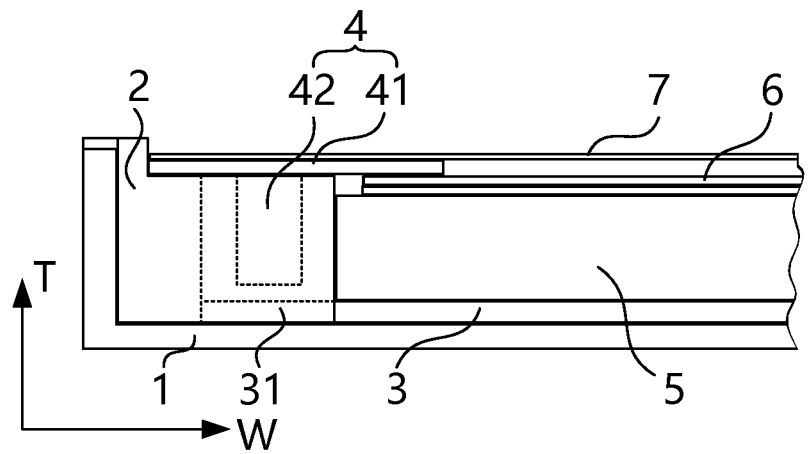
FIG. 1 is a structural schematic diagram of an embodiment of the liquid crystal display apparatus according to the present disclosure.

Various exemplary embodiments of the present disclosure will now be described in detail with reference to the drawings. The description of the exemplary embodiments is merely illustrative, and is in no way intended to limit the invention. The present disclosure can be implemented in many different forms and is not limited to the embodiments described herein. The examples are provided to make the disclosure thorough and complete, and to fully express the scope of the disclosure to those skilled in the art. It should be noted that the relative arrangement of the components set forth in these embodiments should be construed as merely illustrative and not as a limitation.

The words "first," "second," and similar terms used in the present disclosure do not denote any order, quantity, or importance, but are used to distinguish different parts. The words "including" or "comprising" and the like mean that the elements preceding the word include the elements listed after the word, and do not exclude the possibility of the other elements. "Upper", "lower", "left", "right", etc. are only used to indicate the relative positional relationship, and when the absolute position of the object to be described is changed, the relative positional relationship may also change accordingly.

In the present disclosure, when it is described that a particular device is located between the first device and the second device, there may be intervening devices between the particular device and the first device or the second device, or there may be no intervening devices. When it is described that a particular device is connected to other devices, that particular device can be directly connected to the other device without intervening devices, or without intervening devices directly connected to the other devices.

All terms (including technical or scientific terms) used in the present disclosure have the same meaning as understood by one of ordinary skill in the art to which this disclosure belongs, unless specifically defined otherwise. It should also be understood that terms defined in, for example, a general dictionary should be interpreted as having a meaning consistent with their meaning in the context of the related art, without the application of idealized or extremely formal meanings, unless explicitly stated herein defined like this.

Techniques, methods and apparatus known to those of ordinary skill in the relevant art may not be discussed in detail, but the techniques, methods and apparatus should be considered as part of the specification, where appropriate.

In related techniques of the edge-type backlight module, the entirety of the bottom reflective sheet in the backlight module is positioned below the frame for mounting the light source assembly, that is, the entirety of the bottom reflective sheet is lower than a lowest surface of the frame. After study, the inventors find that, since the frame has a suitable special thickness under the requirement of its own strength, it is not easy to reduce the thickness parameter during design. A thickness of the bottom reflective sheet is superimposed on the thickness of the frame such that the backlight module occupies more space in a thickness direction.

In view of the above, embodiments of the present disclosure provide a backlight module and a liquid crystal display apparatus, so as to reduce space occupation of the backlight module in the thickness direction.

FIG. 1 is a structural schematic diagram of an embodiment of the liquid crystal display apparatus according to the present disclosure. In FIG. 1, the liquid crystal display apparatus includes a liquid crystal panel 7 and a backlight module for providing backlight to the liquid crystal panel 7. For convenience of explanations, FIG. 1 shows a thickness direction T and a width direction W of the backlight module, that is, a thickness direction T and a width direction W of the liquid crystal display apparatus. The thickness direction T is a direction which is perpendicular to the liquid crystal panel 7 and faces the liquid crystal panel 7 from the light guide plate 5 of the backlight module. According to the placement of the liquid crystal display apparatus as shown in FIG. 1, the liquid crystal panel 7 is located above the backlight module along the thickness direction T, and can display under the backlight provided by the backlight module. The width direction W is a direction which is parallel to the liquid crystal panel 7 and faces the light guide plate 5 from the light source assembly 4 of the backlight module.

Referring to FIG. 1, in some embodiments, the backlight module includes: a light source assembly 4, a frame 2, and a bottom reflective sheet 3. The light source assembly 4 is used for providing a light source to the backlight module, and at least a portion of the light source assembly 4 is connected to the frame 2. The frame 2 may employ a plastic frame which is not transmissive or has a low transmittance.

In addition, the backlight module may further include some other assemblies, for example, the light guide plate 5 disposed on one side of the frame 2, an optical film 6, and a bottom plate 1. The bottom plate 1, the bottom reflective sheet 3, the light guide plate 5, and the optical film 6 may be sequentially arranged from the bottom up in the thickness direction T. the bottom plate 1 is used for supporting the frame 2, the bottom reflective sheet 3, and other component at the bottom. The light guide plate 5 is used for receiving the light beam emitted from the light source assembly 4, and fulfilling diffusion and uniformity of the light beam so as to form a surface light source. The light source assembly 4 is mounted on one side of the light guide plate 5 using the frame 2, so as to fulfill lateral incidence of the light source. The bottom reflective sheet 3 is used for reflecting the light beam in the light guide plate 5, to cause the light guide plate 5 to output a light beam to the liquid crystal panel 7. The optical film 6 is disposed between the liquid crystal panel 7 and the light guide plate 5, for fulfilling an optical function, e.g. light beam uniformity or large-angle light convergence.

Figure 2:
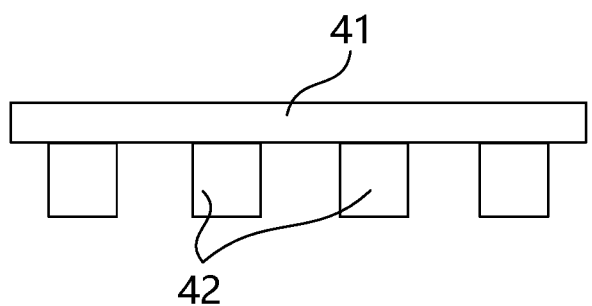
FIG. 2 is a structural schematic diagram of the light source assembly mating with the frame in the embodiment of FIG. 1.

FIG. 2 is a structural schematic diagram of the light source assembly mating with the frame in the embodiment of FIG. 1.

Referring to FIG. 2, in some embodiments, the light source assembly 4 includes: a light source mounting rack 41 and one or more point light sources 42. The light source mounting rack 41 is mounted on the frame 2, and the one or more point light sources 42 (e.g. a light-emitting diode LED or a laser light source) are disposed on a surface of the light source mounting rack 41. For example, the light source assembly 4 is an LED lamp bar including a strip-shaped circuit board and a plurality of LED light beads arranged at intervals in a length direction of the strip-shaped circuit board, wherein the bar circuit board is mounted on the frame 2 as the light source mounting rack 41. The frame 2 may have a mounting surface 21 of the light source mounting rack 41 that mounts and fixes the light source assembly 4, and the mounting surface 21 can closely mate with a lower side surface of the light source mounting rack 41. In some other embodiments, the light source assembly 4 includes Cold Cathode Fluorescent Lamps (briefly referred to as CCFLs).

Referring to FIG. 1, to reduce space occupation of the backlight module in the thickness direction, in some embodiments of the present disclosure, at least a portion of a thickness of the bottom reflective sheet 3 may be overlapped with a thickness of the frame 2 in the thickness direction of the backlight module. In other words, orthographic projections of the bottom reflective sheet 3 and the frame 2 are at least partially overlapped with each other on a certain reference line that extends along the thickness direction T of the backlight module. By using such structure, such a structural form as to entirely dispose the bottom reflective sheet 3 below the frame 2 in related techniques is changed. Since the overlapped thickness portion will not occupy space of the thickness direction, the backlight module may be designed to be thinner in the thickness direction.

To cause the thicknesses of the bottom reflective sheet 3 and the frame 2 to be partially overlapped, in some embodiments at least a portion of the bottom reflective sheet 3 adjacent to the light incident side is embedded into a border of the frame 2 adjacent to the light incident side. Accordingly, the light source assembly 4 may be disposed above the portion of the bottom reflective sheet 3 that is embedded into the frame 2, so as to reflect the light beam emitted from the light source assembly 4 by using the portion of the bottom reflective sheet 3 that is embedded into the frame 2. In some other embodiments, the bottom reflective sheet 3 may be also disposed adjacent to one side of the frame 2 in the width direction W, so as to reflect only the light beam within the light guide plate 5.

Figure 3:
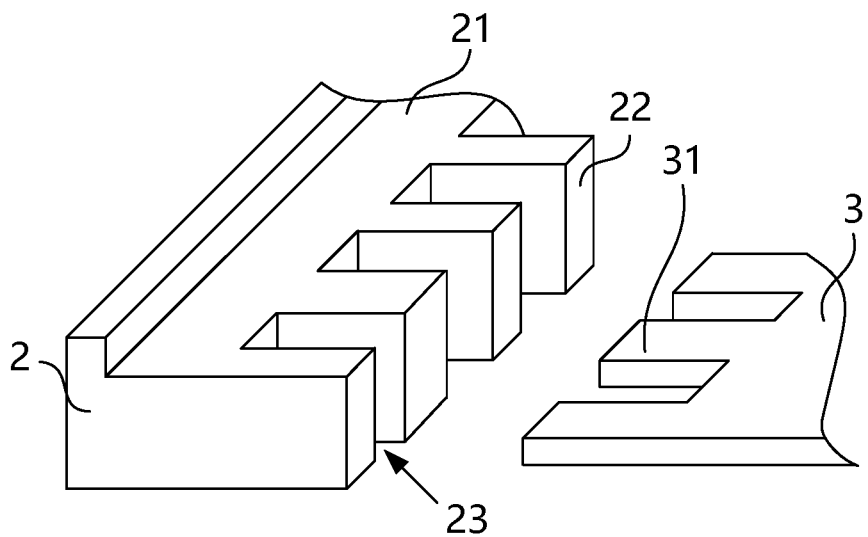
FIG. 3 is a three-dimensional structural schematic diagram in which the frame mates with the bottom reflective sheet in the embodiment of FIG. 1.

FIG. 3 is a three-dimensional structural schematic diagram in which the frame mates with the bottom reflective sheet in the embodiment of FIG. 1.

By combining the structural schematic diagram as shown in FIG. 1, FIG. 3 is explained below. To facilitate the understanding of the mating structure between the frame 2 and the bottom reflective sheet 3, FIG. 3 schematically illustrates a state in which the frame 2 is separate from the bottom reflective sheet.

Referring to FIG. 3, in some embodiments, a concave-convex mating structure is formed between an edge of one side of the bottom reflective sheet 3 adjacent to the frame 2 and the frame 2, that is to say, the bottom reflective sheet 3 and the frame 2 have an embedded portion in the width direction W. Specifically speaking, the concave-convex mating structure in FIG. 3 includes: one or more concave portions 23 located on one side of the frame 2 adjacent to the bottom reflective sheet 3. The concave portion 23 may be formed by a convex structure 22 on one side of on the frame 2 adjacent to the bottom reflective sheet 3 and an inner frame of the frame 2. Alternatively, the concave portion 23 is formed by the convex structure 22 and another adjacent convex structure 22. The concave portion 23 may accommodate a point light source 42 which protrudes downwardly from the above of the frame 2 and fulfill a separating function between the individual point light sources 42. The light beam emitted from one side of the point light source 42 adjacent to the light guide plate 5 can be incident into the light guide plate 5.

The concave-convex mating structure further includes one or more convex portions 31 located at an edge of one side of the bottom reflective sheet 3 adjacent to the frame 2 and embedded into the concave portion 23. By embedding the convex portion 31 of the bottom reflective sheet 3 into the concave portion 23 on the frame 2, the bottom reflective sheet 3 extends to the inside of the frame 2. The embed thickness of the convex portion 31 and the concave portion 23 is an overlap thickness between the light source assembly 4 and the bottom reflective sheet 3. In such a state that the point light source 42 inserts into the concave portion 23, the position of the point light source 42 may be disposed right over the convex portion 31. Accordingly, the projection of the point light source 42 on a plane where the bottom reflective sheet 3 resides is located on an upper surface of the convex portion 31, such that the convex portion 31 reflects the light beam emitted downwardly from the point light source 42 to cause the reflected light beam to enter the light guide plate 5, thus utilizing the point light source 42 more fully.

For the plurality of convex portions 31 disposed on the bottom reflective sheet 3, each convex portion 31 may be manufactured to have a same length, so as to simplify the manufacturing process. The length herein is an extension length of the convex portion 31 with respect to concave portions on both sides of the convex portion 31 in the width direction W. In some other embodiments, a length of at least two convex portions 31 in a direction from the frame 2 to the bottom reflective sheet 3 (namely the width direction W) may be set to be different according to bright/dark situations of the light beam emitted from a different point light source within the light guide plate.

For example, when a lamp bar is disposed on a side of the light guide plate 5, more light beams will be generally converged in the middle region of the light guide plate 5, such that the brightness is made higher than the edge region. To make the brightness within the light guide plate 5 more uniform, among the plurality of convex portions 31 arranged at intervals along an edge of the bottom reflective sheet 3, the length of the convex portion 31 located in the middle region is less than the length of the convex portion 31 located in the end region. Since the reflective effect of the shorter convex portion 31 located in the middle region on this side is weaker than that of the longer convex portion 31 located in the end region on this side, the beam received within the light guide plate 5 is caused to have a more uniform brightness.

Figure 4:
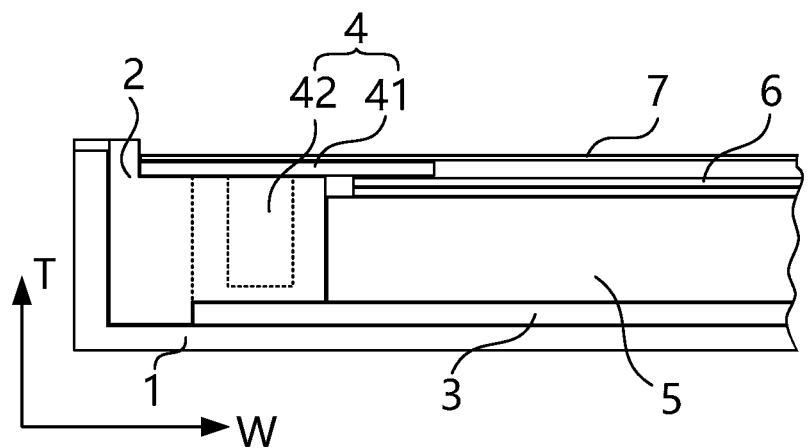
FIG. 4 is a structural schematic diagram of another embodiment of the liquid crystal display apparatus according to the present disclosure.

FIG. 4 is a structural schematic diagram of another embodiment of the liquid crystal display apparatus according to the present disclosure.

As compared with the embodiment as shown in FIG. 1, the backlight module of the present embodiment forms, on the frame 2, an inward concave structure 24 in a direction away from the bottom reflective sheet 3. The bottom reflective sheet 3 is embedded into the inward concave structure 24, and supports the upper side wall of the inward concave structure 24.

Figure 5:
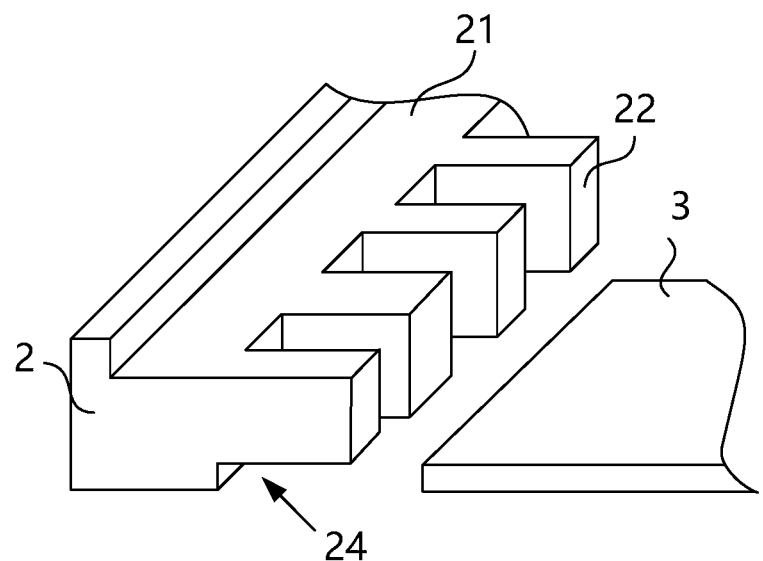
FIG. 5 is a three-dimensional structural schematic diagram in which the frame mates with the bottom reflective sheet in the embodiment of FIG. 4.

FIG. 5 is a three-dimensional structural schematic diagram in which the frame mates with the bottom reflective sheet in the embodiment of FIG. 4.

Referring to FIG. 5, in some embodiments, the inward concave structure 24 may be formed below the frame 2 and adjacent to one side of the light guide plate 5, and a concaving direction is a direction away from the bottom reflective sheet 3. The inward concave structure 24 may accommodate a whole or part of the thickness of the embedded bottom reflective sheet 3, so as to reduce the space occupation of the backlight module in the thickness direction.

In some other embodiments, on one side of the frame 2 adjacent to the bottom reflective sheet 3, one or more concave portions 23 may be disposed to accommodate a point light source 42 that protrudes downwardly from the above of the frame 2 and fulfill the separating function of individual point light sources 42. The embedding portion of the bottom reflective sheet 3 may be not disposed with the convex portion 31 in FIG. 3 but entirely embedded into the inward concave structure 24, thus simplifying the process of the bottom reflective sheet 3. In some other embodiments, the bottom reflective sheet 3 is made according to the thickness of the bottom reflective sheet 3 that a lower portion of the thickness is entirely embedded into the inward concave structure 24 and an upper portion of the thickness is set as a convex portion mating with the concave portion 23.

In addition to the aforementioned embodiments of reducing the occupied space in the thickness direction, the present disclosure further provides the technical means of reducing the occupied space in the width direction in other embodiments. These technical means may be implemented on the basis of the aforementioned various embodiments.

Figure 6:
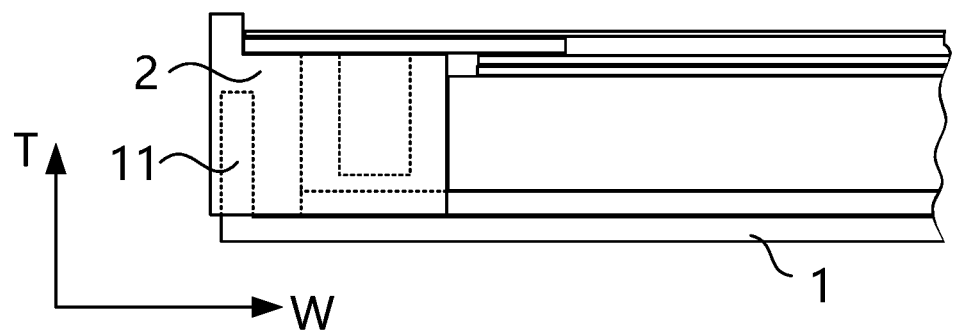
FIG. 6 is a structural schematic diagram of still another embodiment of the liquid crystal display apparatus according to the present disclosure.

FIG. 6 is a structural schematic diagram of still another embodiment of the liquid crystal display apparatus according to the present disclosure.

Referring to FIG. 6, in some embodiments, the backlight module further includes a bottom plate 1 located below the frame 2. The bottom plate 1 is further connected with a side plate 11 on an end or upper side surface. The side plate 11 is embedded into an entity portion of the frame 2 in a thickness direction of the frame 2, to fulfill the fixing relation between the bottom plate 1 and the frame 2. The entity portion of the frame 2 may be disposed with a concave structure that mates with the side plate 11. Since a size of the side plate 11 in the width direction W is overlapped with the width of the frame 2, the space occupied by the backlight module in the width direction W becomes smaller.

Figure 7:
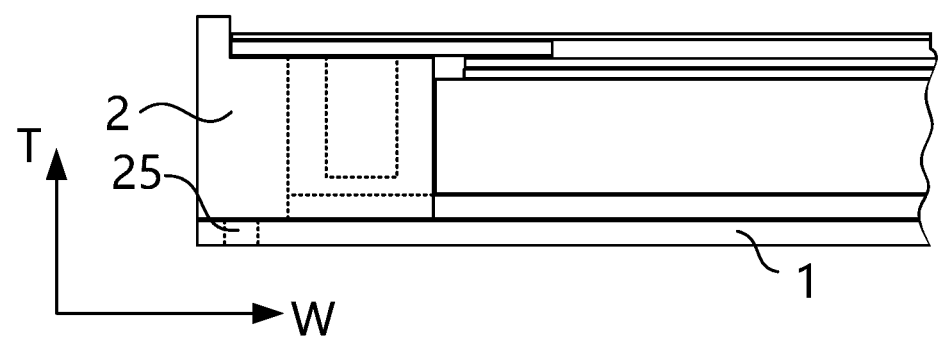
FIG. 7 is a structural schematic diagram of yet another embodiment of the liquid crystal display apparatus according to the present disclosure.

FIG. 7 is a structural schematic diagram of yet another embodiment of the liquid crystal display apparatus according to the present disclosure.

Referring to FIG. 7, in some embodiments, the backlight module further includes a bottom plate 1 located below the frame 2. The frame 2 is connected with a positioning portion 25 on an end or lower side surface. The positioning portion 25 is embedded into the bottom plate 1 in a thickness direction of the frame 2. The positioning portion 25 may use a downwardly convex bump relative to the lower side surface of the frame 2, and the bump may be embedded into and fixed to a concave pit provided on the bottom plate 1 in an interference fit during the assembling. Since such structure considers the fixing between the bottom plate 1 and the frame 2, the side plate 11 may be omitted. Therefore, the space occupied by the backlight module may become smaller when the side plate 11 is omitted.

Heretofore, various embodiments of the present disclosure have been described in detail. In order to avoid obscuring the concepts of the present disclosure, some details known in the art are not described. Those skilled in the art can fully understand how to implement the technical solutions disclosed herein according to the above description.

While some specific embodiments of the present disclosure have been described in detail by way of example, it should be understood that those skilled in the art will appreciate that the above embodiments may be modified or substituted for some of the technical features without departing from the scope and spirit of the disclosure. The scope of the disclosure is defined by the appended claims.

What is claimed is:

1. A backlight module, comprising:
a light source assembly;
a frame, to which at least a portion of the light source assembly is connected; and
a bottom reflective sheet, at least a portion of a thickness of which is overlapped with a thickness of the frame in a thickness direction of the backlight module,
wherein a concave-convex mating structure is formed between an edge of one side of the bottom reflective sheet adjacent to the frame and the frame, and the concave-convex mating structure comprises:
one or more concave portions located on one side of the frame adjacent to the bottom reflective sheet; and
one or more convex portions located at an edge of one side of the bottom reflective sheet adjacent to the frame and embedded into the one or more concave portions,
wherein the one or more convex portions comprise at least two convex portions, which have different lengths in a direction from the frame to the bottom reflective sheet.

2. The backlight module according to claim 1, wherein at least a portion of the bottom reflective sheet adjacent to a light incident side is embedded into a border of the frame adjacent to the light incident side.

3. The backlight module according to claim 2, wherein the light source assembly is located above a portion of the bottom reflective sheet that is embedded into the frame.

4. The backlight module according to claim 1, wherein the light source assembly comprises:
a light source mounting rack mounted on the frame; and
one or more point light sources disposed on a surface of the light source mounting rack;
wherein the one or more point light sources protrude into the one or more concave portions and are located over the one or more convex portions.

5. The backlight module according to claim 1, wherein among the at least two convex portions arranged at intervals along the edge of the bottom reflective sheet, a length of convex portions located in a middle region of the side is less than a length of convex portions located in an end region of the side.

6. The backlight module according to claim 2, wherein an inward concave structure in a direction away from the bottom reflective sheet is formed on the frame, and the bottom reflective sheet is embedded into the inward concave structure and supports an upper side wall of the inward concave structure.

7. The backlight module according to claim 1, further comprising: a bottom plate located below the frame and further connected with a side plate, the side plate being embedded into an entity portion of the frame along a thickness direction of the frame.

8. The backlight module according to claim 1, further comprising: a bottom plate located below the frame and further connected with a positioning portion, the positioning portion being embedded into the bottom plate along a thickness direction of the frame.

9. A liquid crystal display apparatus, comprising the backlight module according to claim 1.

* * * * *